US012462637B2

(12) United States Patent
LaRoach

(10) Patent No.: US 12,462,637 B2
(45) Date of Patent: Nov. 4, 2025

(54) REEL MOUNT ASSEMBLY FOR USE WITH AN ELECTRONIC GAMING MACHINE

(71) Applicant: Aristocrat Technologies, Inc., Las Vegas, NV (US)

(72) Inventor: Philip LaRoach, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 286 days.

(21) Appl. No.: 18/297,457

(22) Filed: Apr. 7, 2023

(65) Prior Publication Data

US 2024/0338995 A1 Oct. 10, 2024

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC ....... G07F 17/32; G07F 17/3213; G07F 17/34
USPC ........................................................... 463/20
See application file for complete search history.

(56) References Cited

U.S. PATENT DOCUMENTS

| | | | | |
|---|---|---|---|---|
| 5,102,136 | A * | 4/1992 | Heidel | G07F 17/3213 273/143 R |
| 5,209,477 | A | 5/1993 | Heidel | |
| 8,388,433 | B2 | 3/2013 | Stewart | |
| 8,662,984 | B2 | 3/2014 | Haga | |
| 9,165,434 | B2 | 10/2015 | Stewart | |
| 2009/0176550 | A1 | 7/2009 | Cove | |
| 2021/0110642 | A1* | 4/2021 | Ocampo | G07F 17/3211 |

* cited by examiner

*Primary Examiner* — Ryan Hsu
(74) *Attorney, Agent, or Firm* — Aristocrat Technologies, Inc.

(57) ABSTRACT

An electronic gaming system that includes an electronic gaming machine (EGM) including a cabinet and a reel mount assembly for mounting a plurality of reels within the cabinet is described. The reel mount assembly includes a back panel comprising a plurality of apertures to receive an electrical connection between one of the plurality of reels and the EGM. The reel mount assembly also includes at least one sliding panel comprising a locking mechanism, wherein the at least one sliding panel is moveable in relation to the back panel and configured to be coupled to a reel of the plurality of reels. The reel mount assembly is configurable between one or more reel mounting configurations based on a position of the at least one sliding panel.

20 Claims, 16 Drawing Sheets

REEL MOUNT ASSEMBLY FOR USE WITH AN ELECTRONIC GAMING MACHINE

TECHNICAL FIELD

The field of disclosure relates generally to electronic gaming, and more specifically, to an electronic gaming system that includes a reel mount assembly for use with an electronic gaming machine (EGM), wherein the reel mount assembly is configurable to support multiple reel configurations (e.g., the number of reels supported) for the EGM.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes an electronic gaming machine (EGM) including a cabinet and a reel mount assembly for mounting a plurality of reels within the cabinet. The reel mount assembly includes a back panel comprising a plurality of apertures to receive an electrical connection between one of the plurality of reels and the EGM. The reel mount assembly also includes at least one sliding panel comprising a locking mechanism, wherein the at least one sliding panel is moveable in relation to the back panel and configured to be coupled to a reel of the plurality of reels. The reel mount assembly is configurable between one or more reel mounting configurations based on a position of the at least one sliding panel, the one or more reel mounting configurations including at least a first number of reels of the plurality of reels and a second number of reels of the plurality of reels.

In another aspect, a reel mount assembly for mounting a plurality of reels within an electronic gaming machine (EGM) is described. The reel mount assembly includes a back panel comprising a plurality of apertures to receive an electrical connection between one of a plurality of reels and the EGM. The reel mount assembly also includes at least one sliding panel comprising a locking mechanism, wherein the at least one sliding panel is moveable in relation to the back panel and configured to be coupled to a reel of the plurality of reels. The reel mount assembly is configurable between one or more reel mounting configurations based on a position of the at least one sliding panel, the one or more reel mounting configurations including at least a first number of reels of the plurality of reels and a second number of reels of the plurality of reels.

BRIEF DESCRIPTION OF THE DRAWINGS

An example embodiment of the subject matter disclosed will now be described with reference to the accompanying drawings.

DETAILED DESCRIPTION

The present application is directed to electronic gaming machines (EGMs), and more specifically, to an electronic gaming machine that includes a reel mount assembly that is configurable to support multiple reel configurations (e.g., different number of reels) for the EGM. The reel mount assembly may be configured to support multiple reel configurations (e.g., 5 reels, 4 reels, 3 reels, etc.), with the reel mount assembly being configurable between at least a three (3) reel and a five (5) reel configuration. Embodiments of the present disclosure represent a technical improvement in the art of electronic gaming machines, systems, and operations for such electronic gaming machines and/or systems. Technical improvements represented by the present disclosure include: (i) a configurable reel mounting system that can easily be adjusted to accommodate five (5) reels or three (3) reels without needing to remove and/or replace parts within the electronic gaming machine cabinet; (ii) a configurable reel mounting system with adjustable panels that can be manually moved between different reel configurations without the use of tools; and (iii) a configurable reel mounting system that can be universally used with electronic gaming machines including three (3) reel and/or five (5) reel machines.

Figure 1:
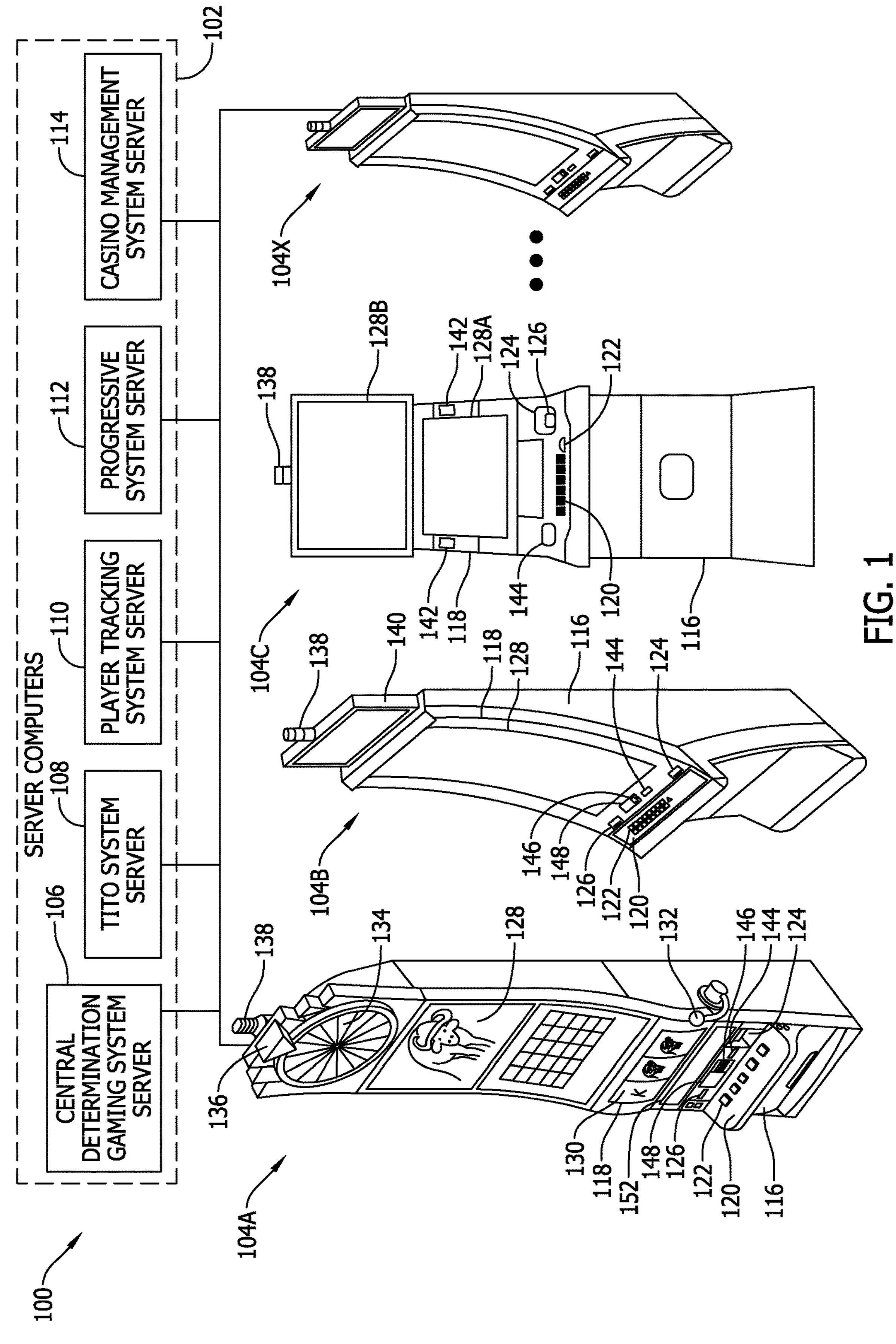
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more server computers 102 described herein.

The server computers 102 may include a central determination gaming system server (not separately shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main or service door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XLTM model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket (e.g., a voucher) to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
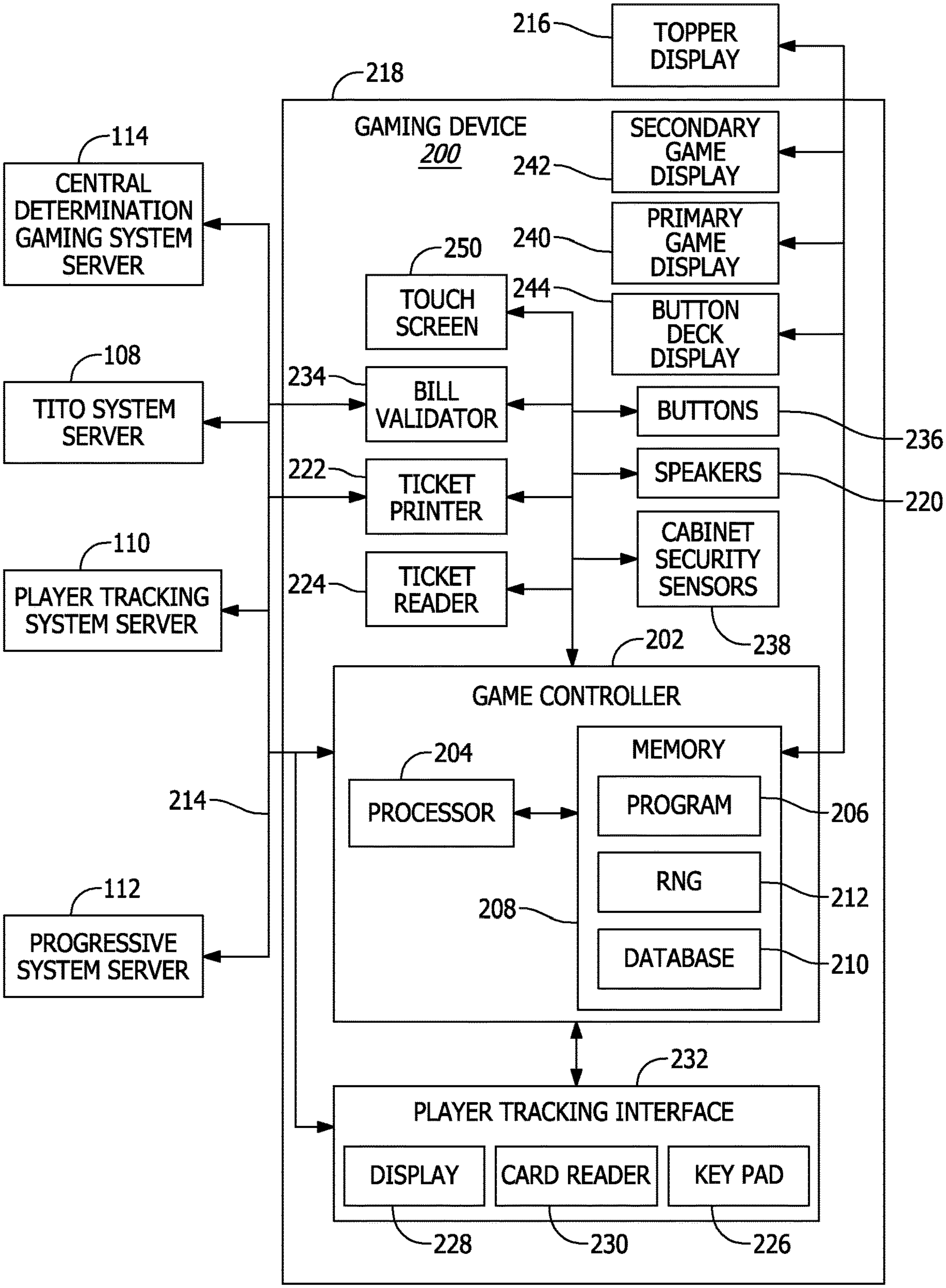
FIG. 2A is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2A.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main or service door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Yet another example gaming device 104X is a tabletop or bar top gaming device that may provide many different types of games, including, for example, mechanical slot games, video slot games, video poker, video blackjack, video pachinko, keno, bingo, and lottery. Each EGM 104 may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Any of the EGMs 104 may include a button deck 120. In the example embodiments described herein, the button deck 120 may include a button deck (not separately shown in FIG. 1) that includes one or more buttons 122 that may be configurable and that may be back-lit by an LCD button deck display device within the button deck 120.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
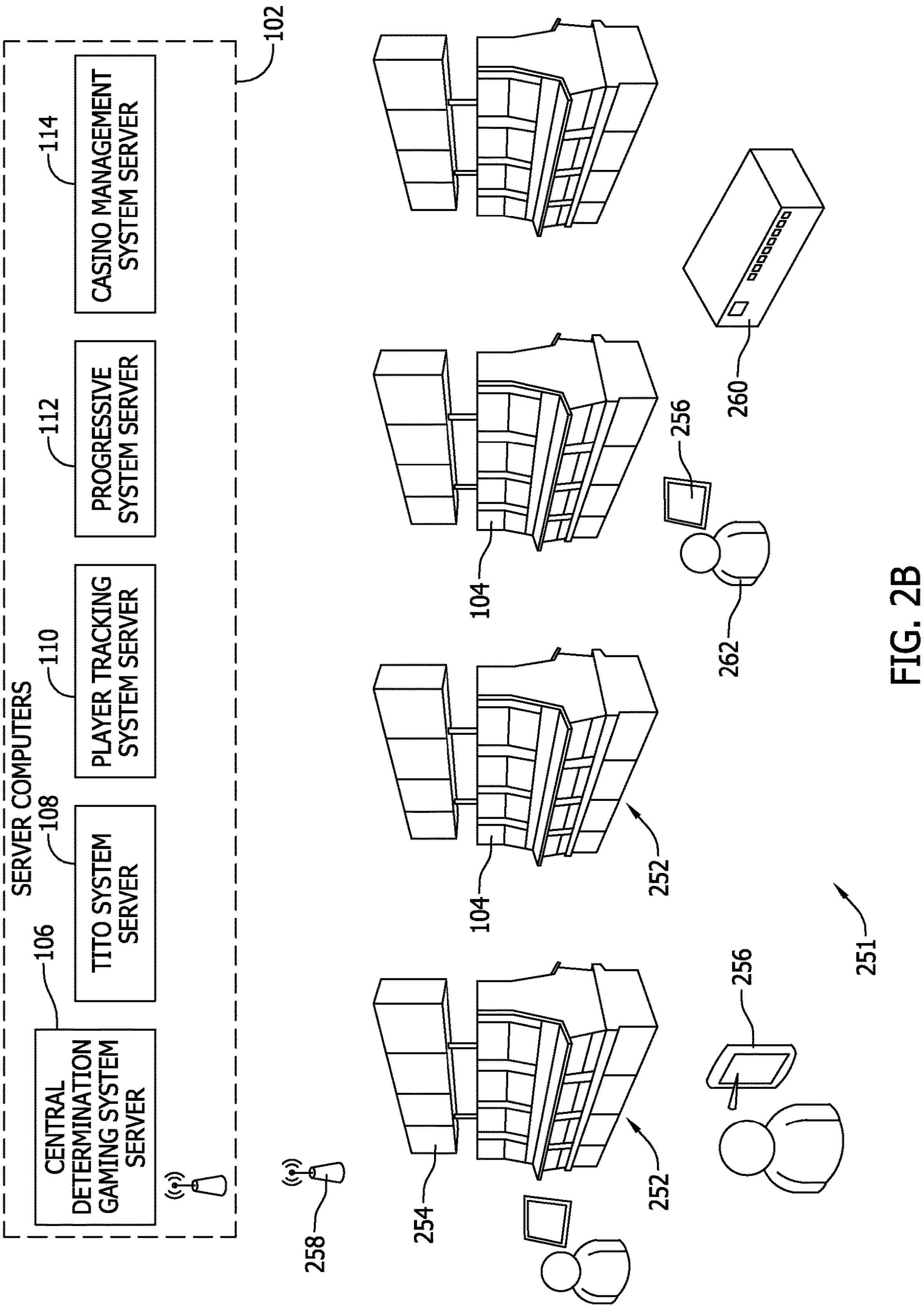
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
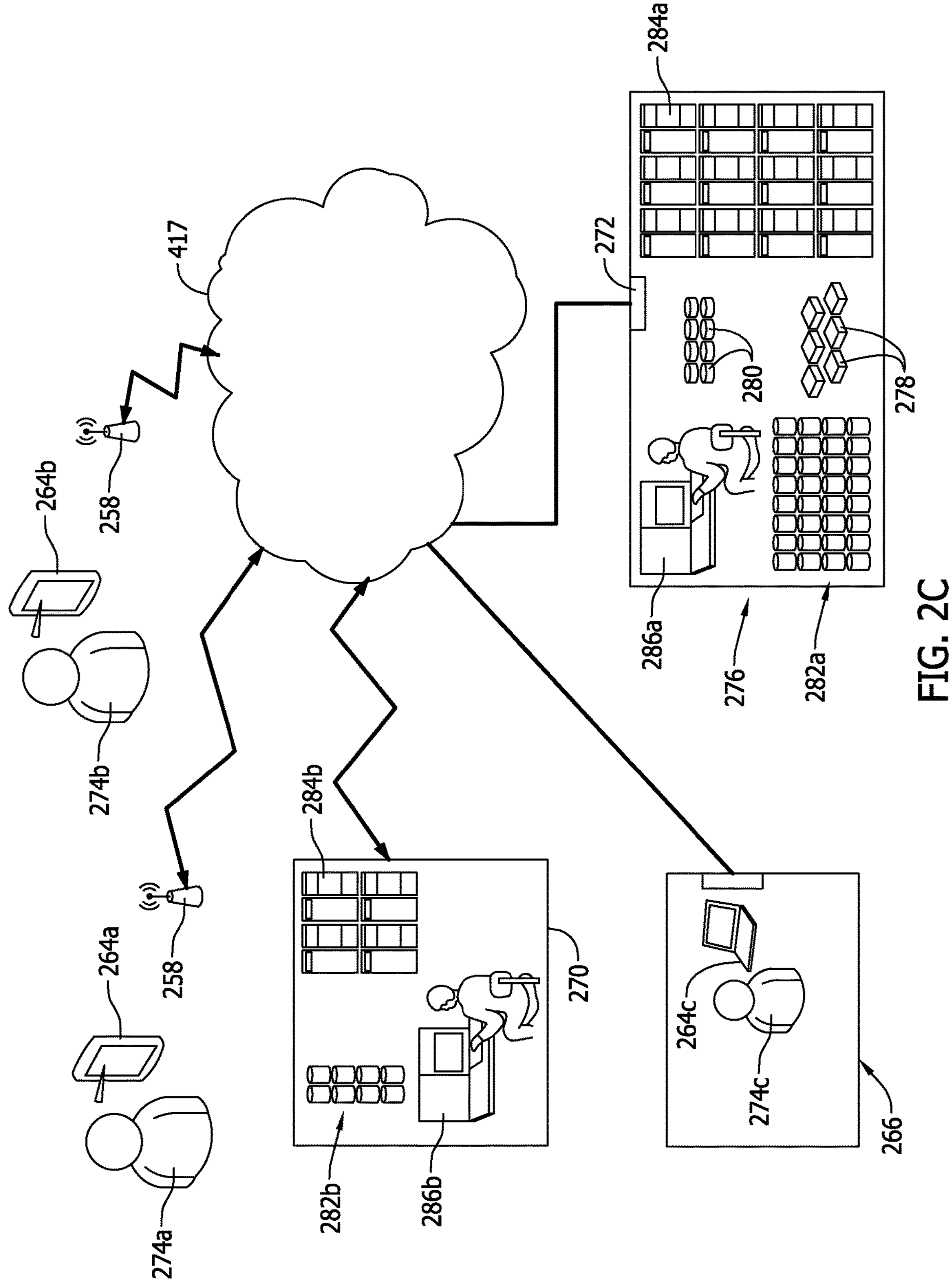
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
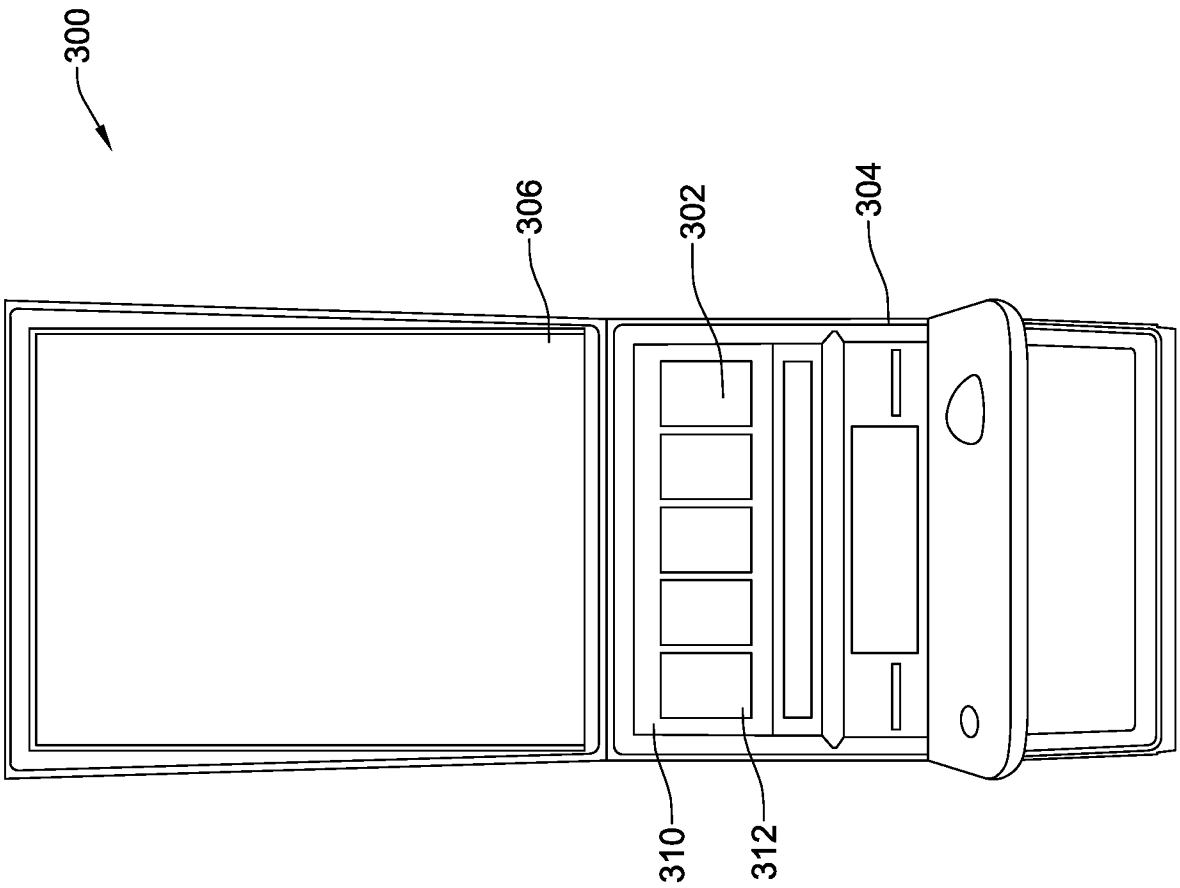
FIG. 3 is a front view of an EGM with an example reel mount assembly in accordance with one embodiment of the present disclosure.

FIG. 3 is a front view of an example gaming machine 300 with a configurable reel mount assembly 302 in accordance with the present disclosure. In some embodiments, reel mount assembly 302 may be installed on an EGM such as gaming devices 104A-104X, 256, and/or 264*a*-264*c*. In the example embodiment, the gaming machine 300 includes a cabinet 304 and a display device 306. The cabinet 304 may house a plurality of reel slots 308 (shown in FIG. 4) positioned behind a reel display panel 310. The reel display panel 310 includes a plurality of reel windows 312, through which a reel mechanism within each of the plurality of reel slots 308 (shown in FIG. 4) is visible.

Figure 4:
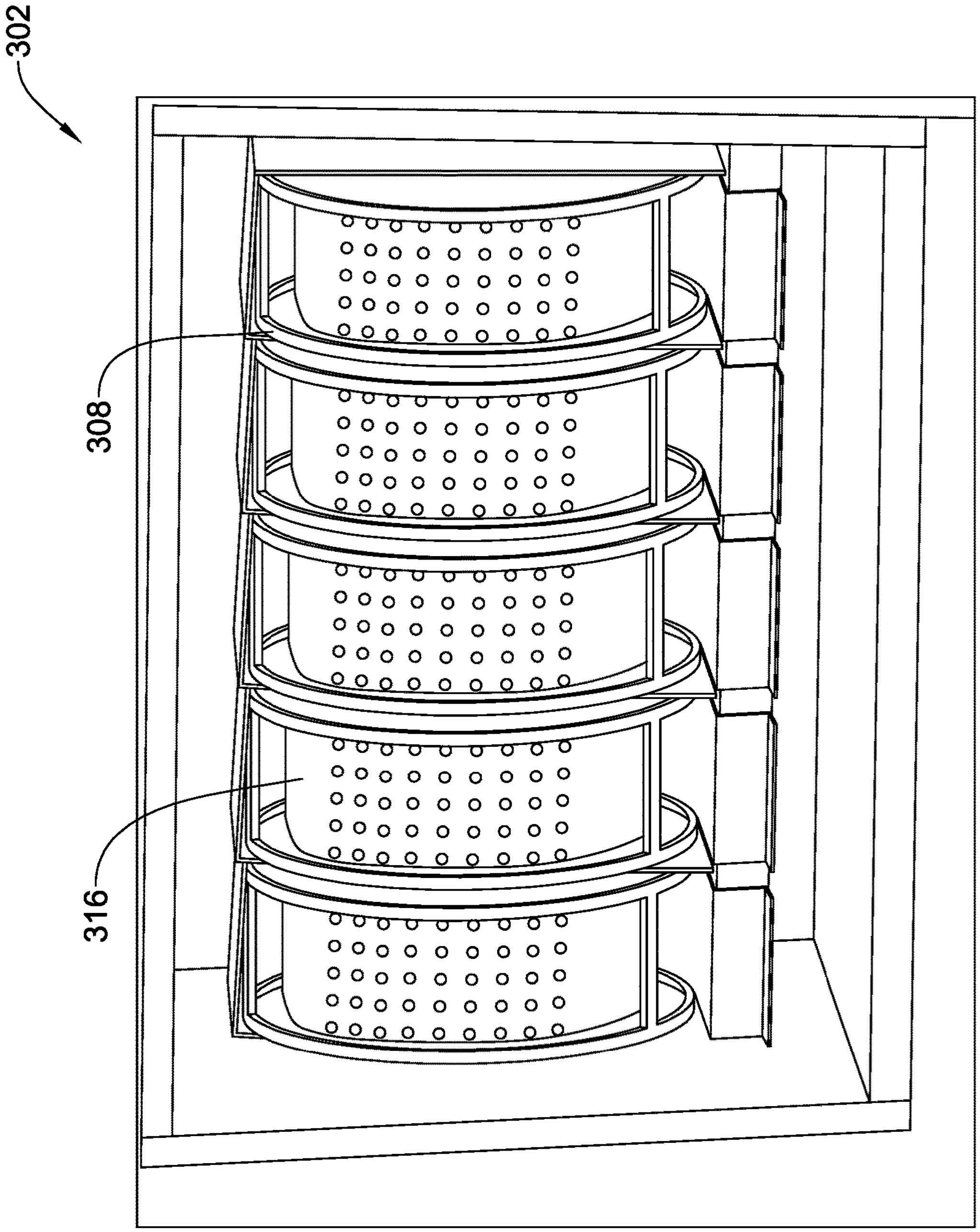
FIG. 4 is a front view of the example reel mount assembly shown in FIG. 3 with a five (5) reel configuration in place.

In the example embodiment, the reel mount assembly 302 is configurable to support multiple reel configurations. More specifically, in the example embodiment, the reel mount assembly 302 is configurable to support a first reel configuration including five (5) of the reel slots 308 (shown in FIG. 3) and a second reel configuration including three (3) of the reel slots 308. As shown in FIGS. 3 and 4, the reel mount assembly 302 may be configured to support the first reel configuration including five of the reel slots 308.

FIG. 4 is a front view of the reel mount assembly 302 for use with the gaming machine 300 with reel display panel 310 removed showing the reel mount assembly 302 in the five (5) reel configuration. As shown in FIG. 4, the reel mount assembly 302 may be configured to support five (5) of the reel slots 308 in the first reel configuration. In the example embodiment, the first reel configuration is configured to accommodate a first reel mechanism 316 within each of the reel slots 308. In some embodiments, the first reel mechanism 316 may have a width of about 85 millimeters (mm). In other embodiments, the first reel mechanism 316 may have a width less than or greater than 85 mm.

Figure 5:
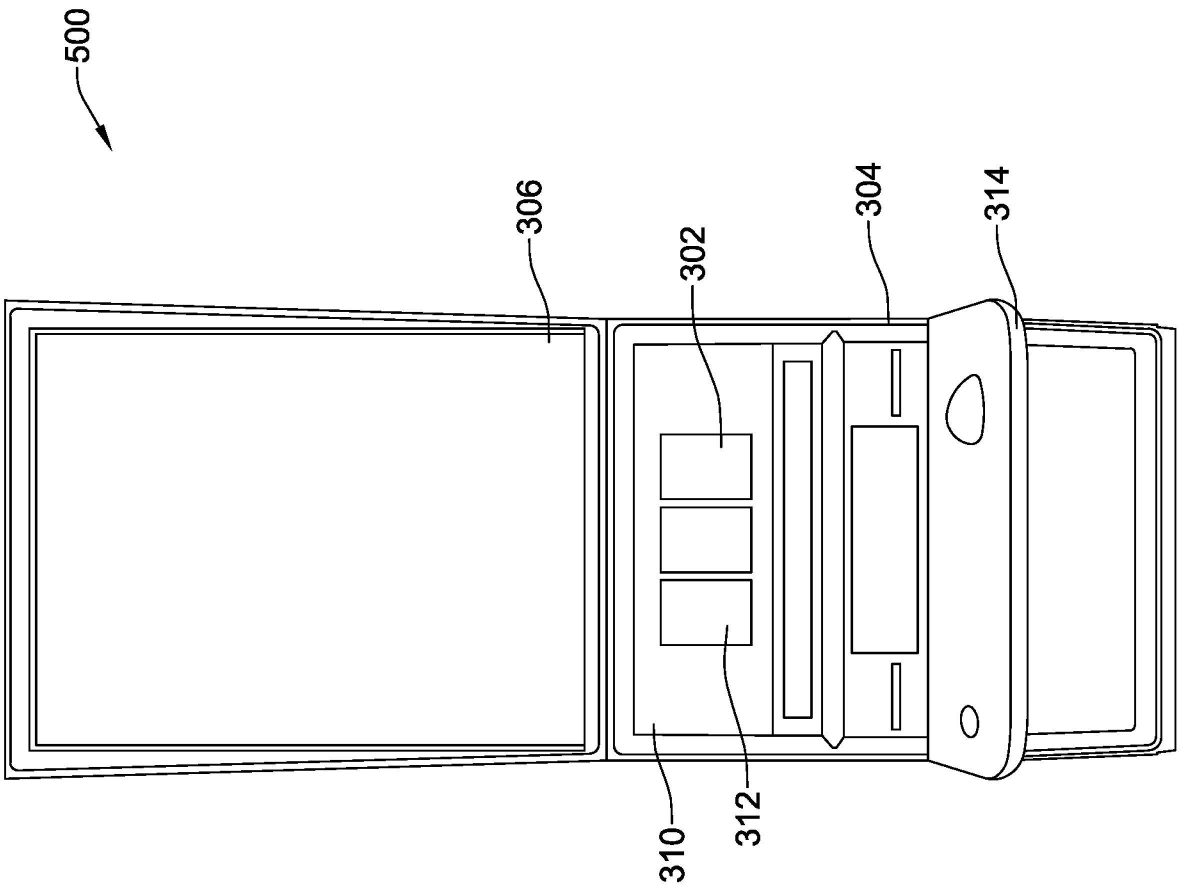
FIG. 5 is a front view of an EGM with an example reel mount assembly positioned within the EGM.
Figure 6:
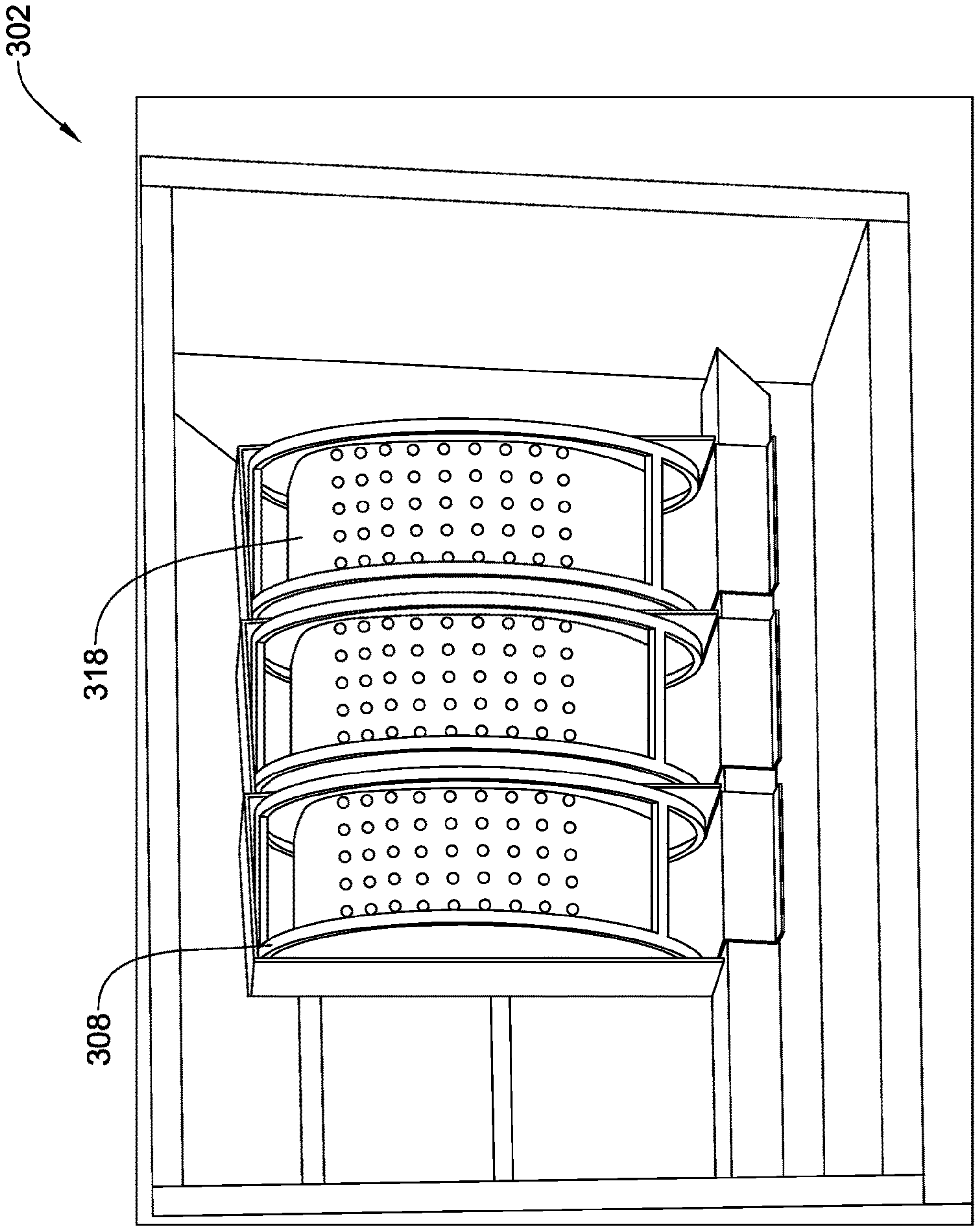
FIG. 6 is a front view of the example reel mount assembly shown in FIG. 5 with a three (3) reel configuration in place.

FIG. 5 is a front view of a gaming machine 500 with the reel mount assembly 302. Gaming machine 500 differs from gaming machine 300 in that the reel mount assembly 302 of gaming machine 500 is reconfigured to support a different reel configuration. As shown in FIGS. 5 and 6, the reel mount assembly 302 may be configured to support the three (3) reel slots 308 in the second reel configuration.

FIG. 6 is a front view of the reel mount assembly 302 for use with the gaming machine 500 with reel display panel 310 removed showing the reel mount assembly 302 in the three (3) reel configuration. As shown in FIG. 6, the reel mount assembly may be configured to support three (3) reel slots 308 in the second reel configuration. In the example embodiment, the second reel configuration is configured to accommodate a second reel mechanism 318 within each of the reel slots 308. In some embodiments, the second reel mechanism 318 may have a width of about 95 millimeters (mm). In other embodiments, the second reel mechanism 318 may have a width less than or greater than 95 mm.

The width of the first reel mechanism 316 (shown in FIG. 4) may be less than the width of the second reel mechanism 318 (shown in FIG. 6), such that the first reel mechanism 316 (shown in FIG. 4) may be described as being narrower than the second reel mechanism 318 (shown in FIG. 6). Thus, the reel mount assembly 302 may accommodate an increased number of the first reel mechanism 316 (shown in FIG. 4) than of the second reel mechanism 318 (shown in FIG. 6) based on the narrower profile of the first reel mechanism 316.

Figure 7:
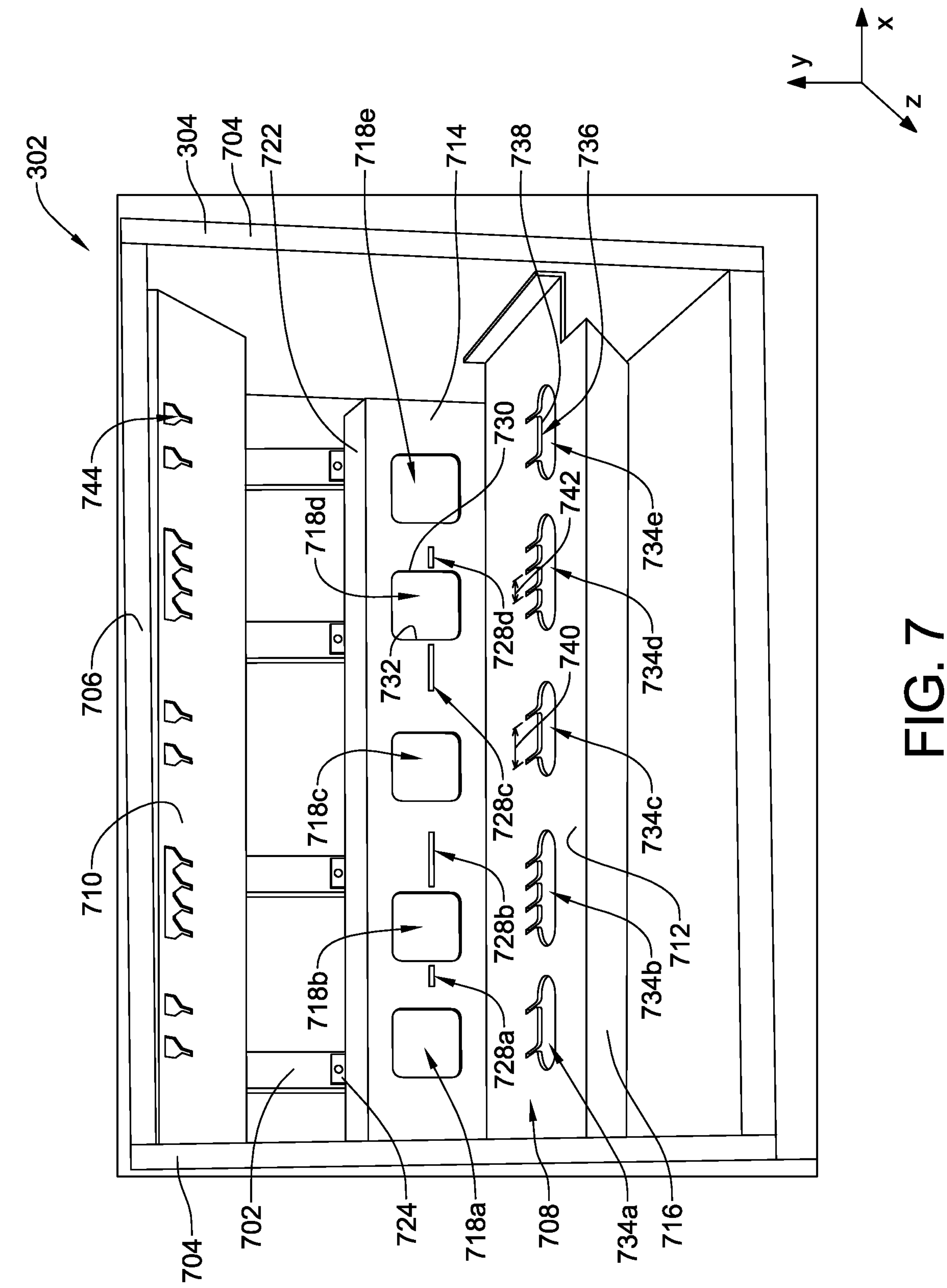
FIG. 7 is a front view of an example reel mount assembly with the reels removed.

FIG. 7 is a front view of the reel mount assembly 302 within the cabinet 304 with the reel mechanisms 318 removed so that the reel mounting locations are visible. In the example embodiment, the cabinet 304 includes a back wall 702 between a pair of side walls 704. The side walls 704 and the back wall 702 extend vertically along the y-plane, with the side walls 704 being substantially perpendicular to the back wall 702. In the example embodiment, the cabinet 304 also includes a top wall 706 between the pair of side walls 704. The top wall 706 extends horizontally along the x-z plane, with the top wall 706 being substantially perpendicular to the back wall 702 and the side walls 704. In the example embodiment, a cavity 708 is defined by the back wall 702, the side walls 704, and the top wall 706.

In the example embodiment, the reel mount assembly 302 includes a top panel 710, a bottom panel 712, and a back panel 714. The bottom panel 712 extends between the side walls 704 of the cabinet 304, the bottom panel 712 extending horizontally along the x-z plane and being substantially parallel to the top wall 706 of the cabinet 304. The bottom panel 712 may have a front lip 716 that extends vertically along the y-plane, the front lip 716 being substantially perpendicular to the bottom panel 712 and substantially parallel to the back wall. The back panel 714 extends between the side walls 704 of the cabinet, the back panel 714 extending vertically along the y-plane and being substantially parallel to the back wall 702.

The bottom panel 712 may be secured within the cabinet 304 by any means known in the art that facilitates the systems described herein. For example, in some embodiments, the bottom panel 712 may be secured to each of the side walls 704 via one or more fasteners, such as, but not limited to, screws. Additionally, for example, in other embodiments, the bottom panel 712 may slide into tracks along each of the side walls 704. The panels of the reel mount assembly 302 (e.g., the top panel 710, the bottom panel 712, and/or the back panel 714) may be manufactured from a metal material to facilitate improving the rigidity and durability of the reel mount assembly 302.

The bottom panel 712 may have a substantially rectangular shape, with a length dimension along the x-direction that is greater than a width dimension along the z-direction. The back panel 714 may also have a substantially rectangular shape, with a length dimension along the x-direction that is greater than a width dimension along the y-direction. Additionally, the top panel 710 may have a substantially rectangular shape, with a length dimension along the x-direction that is greater than a width dimension along the y-direction. In some embodiments, the bottom panel 712, the back panel 714, and/or the top panel 710 may have a different shape.

In the example embodiment, the top panel 710 extends from the back wall 702 of the cabinet at an angle α greater than 90° (shown in FIG. 9), such that the top panel 710 may be described as extending "away from" the bottom panel 712. Additionally, in the example embodiment, the top panel 710 extends from the top wall 706 of the cabinet at an angle β greater than 90° (shown in FIG. 9), such that the top panel 710 may be described as extending "away from" the top wall 706.

In the example embodiment, the back panel 714 includes a plurality of back apertures 718. As shown in FIG. 7, the plurality of back apertures 718 may include a first back aperture **718*a*, a second back aperture 718*b*, a third back aperture 718*c*, a fourth back aperture 718*d*, and/or a fifth back aperture 718*e*. The back apertures 718 may vary in size and shape. For example, in some embodiments, one or more of the back apertures 718 may have an approximate square shape with rounded corners. Additionally, for example, in other embodiments, one or more of the back apertures 718 may have a different shape. In the example embodiment, the back panel 714 is offset from (e.g., not in face-to-face contact with) the back wall 702 of the cabinet 304 (shown in FIG. 9) to provide space for wiring 720 (shown in FIG. 8) that connects with the reel mechanism within each reel slot 308 through the respective back aperture 718**.

The back panel 714 may have a top lip 722 that extends horizontally along the x-z plane, the top lip 722 being substantially perpendicular to the back panel 714 and substantially parallel to the bottom panel 712. The top lip 722 may be secured to the back wall 702 by any means known in the art that facilitates the systems described herein. For example, in some embodiments, the top lip 722 may include one or more tabs 724 that extend substantially perpendicular to the top lip 722 and substantially parallel to the back panel 714 for securing the back panel 714 to the back wall 702 via one or more fasteners. The one or more tabs 724 may vary in size and shape.

In the example embodiment, the back panel 714 includes a plurality of channels 728 proximate to one or more of the plurality of back apertures 718. As shown in FIG. 7, the plurality of channels 728 may include a first channel **728*a*, a second channel 728*b*, a third channel 728*c*, and/or a fourth channel 728*d*. The plurality of channels 728 may be proximate to the second and fourth back apertures 718*b*, 718*d*, as shown in FIG. 7. For example, the first and second channels 728*a*, 728*b* may be proximate to the second back aperture 718*b*. Additionally, for example, the third and fourth channels 728*c*, 728*d* may be proximate to the fourth back aperture 718*d***.

One or more of the plurality of channels 728 may extend from one or more of the plurality of back apertures 718. For example, the first and fourth channels 728*a*, 728*d* may extend from an outer edge 730 of the respective back aperture 718, such that the first and fourth channels 728*a*, 728*d* may be described as extending "towards" the respective side wall 704. The first and fourth channels 728*a*, 728*d* may vary in size and shape. For example, the first and fourth channels 728*a*, 728*d* may be a narrow rectangle shape with a rounded end nearest the respective side wall 704. Additionally, for example, the first and fourth channels 728*a*, 728*d* may have a taper end that connects to the respective back aperture 718.

Additionally, for example, the second and third channels 728*b*, 728*c* may be proximate to an inner edge 732 of the respective back aperture 718, such that the second and third channels 728*b*, 728*c* may be described as extending "towards" a center of the back panel 714. The second and third channels 728*b*, 728*c* may vary in size and shape. For example, the second and third channels 728*b*, 728*c* may be a narrow rectangle shape with a rounded end nearest the respective back aperture 718. Additionally, for example, the second and third channels 728*b*, 728*c* may have a circular end furthest from the respective back aperture 718.

In the example embodiment, the bottom panel 712 includes a plurality of bottom apertures 734. The bottom apertures 734 may vary in size and shape. For example, in some embodiments, one or more of the bottom apertures 734 may have an approximate oval shape. Additionally, for example, one or more of the bottom apertures 734 may have a different shape. As shown in FIG. 7, the plurality of bottom apertures may include a first bottom aperture 734*a*, a second bottom aperture 734*b*, a third bottom aperture 734*c*, a fourth bottom aperture 734*d*, and a fifth bottom aperture 734*c*.

One or more of the plurality of bottom apertures 734 may have one or more slits 736 extending from a back edge 738 of the bottom aperture 734, such that the slits 736 may be described as extending "towards" the back panel 714. As shown in FIG. 7, each of the first, third, and fifth bottom apertures 734*a*, 734*c*, 734*e* may have two of the slits 736 extending from the respective back edge 738, with the slits 736 separated by a first width 740. In some embodiments, the first width 740 may be in a range of from about 20 mm to about 100 mm. Additionally, as shown in FIG. 7, each of the second and fourth bottom apertures 734*b*, 734*d* may have four of the slits 736 extending from the respective back edge 738, with the slits 736 separated by a second width 742. In some embodiments, the second width 742 may be in a range of from about 20 mm to about 60 mm.

In the example embodiment, the first width 740 may be greater than the second width 742, such that the slits 736 separated by the second width 742 may be described as being "closer together" than the slits 736 separated by the first width 740. Thus, the second and fourth bottom apertures 734*b*, 734*d* may have an increased number of slits 736 extending from the respective back edge 738 based on the decreased width between the slits 736.

In the example embodiment, the top panel 710 includes a plurality of slots 744. The slots 744 may vary in size and shape. For example, in some embodiments, one or more of the plurality of slots 744 may have an approximate rectangle shape, with a rounded end nearest a bottom edge 746 of the top panel 710 and a circular end nearest the top wall 706 of the cabinet. Additionally, for example, in other embodiments, one or more of the plurality of slots 744 may have a different shape. As shown in FIG. 7, the top panel 710 may include a matching number of slots 744 as the number of slits 736 extending from the bottom apertures 734 on the bottom panel 712. Additionally, as shown in FIG. 7, the spacing between the slots 744 may substantially match the spacing between the slits 736 extending from the bottom apertures 734.

One or more of the plurality of bottom apertures 734 and/or one or more of the slits 736 may be sized to receive at least a part of a reel mechanism to mount the reel mechanism within the reel slot 308. Additionally, one or more of the plurality of slots 744 may be sized to receive at least a part of the reel mechanism for mounting within the reel slot 308.

Figure 8:
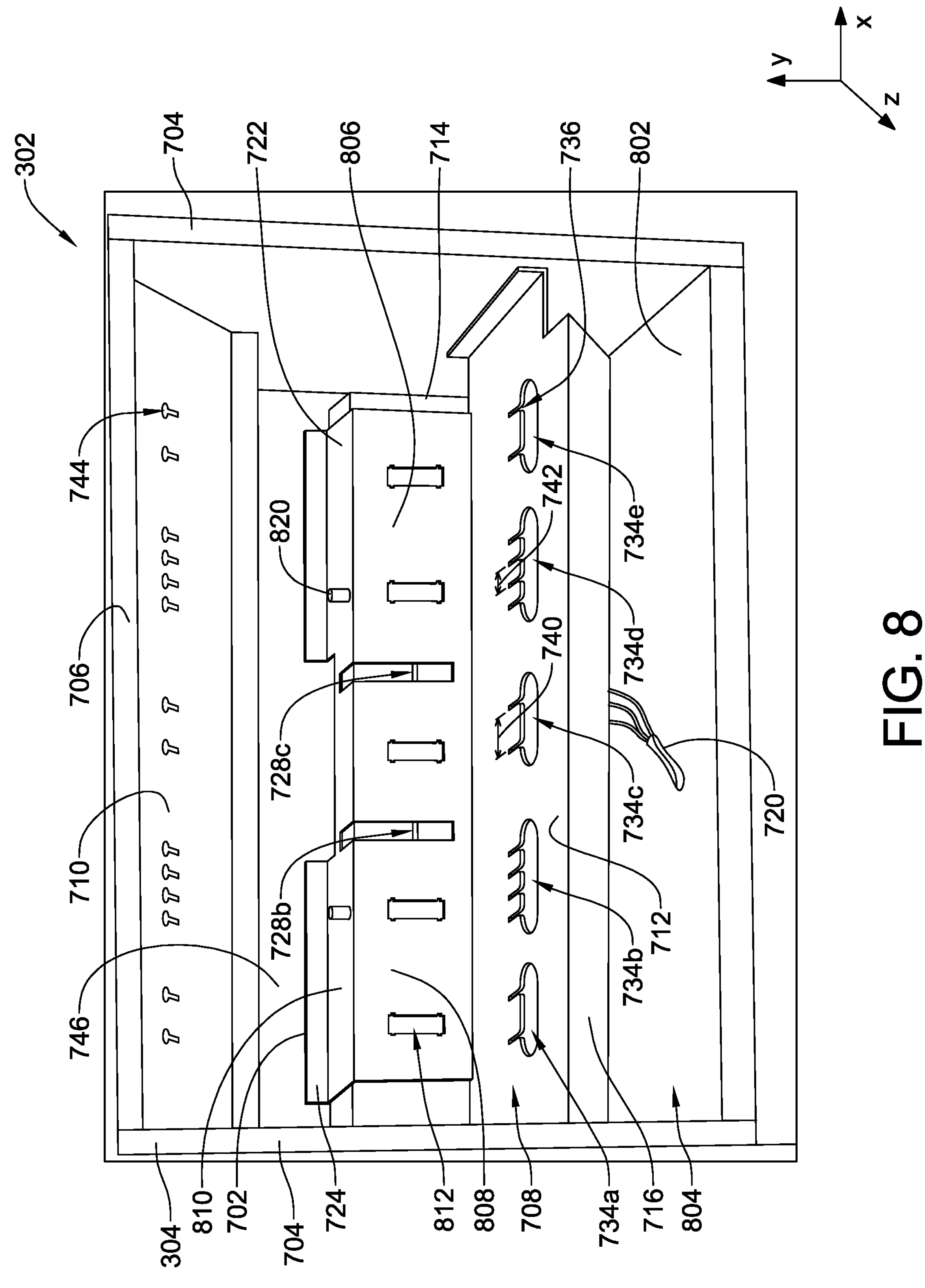
FIG. 8 is another front view of the example reel mount assembly shown in FIG. 7.

FIG. 8 is a front view of the reel mount assembly 302 within the cabinet 304 with the reel mechanisms 318 removed so that the reel mounting locations are visible. In the example embodiment, the cabinet 304 also includes a bottom wall 802 between the side walls 704. The bottom wall 802 extends horizontally along the x-z plane, the bottom wall 802 being substantially perpendicular to the back wall 702 and substantially parallel to the top wall 706. In the example embodiment, the bottom wall 802 is below the bottom panel 712 of the reel mount assembly 302, such that a second cavity 804 is defined by the side walls 704, the bottom panel 712, and the bottom wall 802.

In the example embodiment, the reel mount assembly 302 also includes a plurality of panels 806. Each panel 806 includes a front panel 808 and a top panel 810, with the top panel 810 connected to, and substantially perpendicular to, the front panel 808. The front panel 808 is substantially parallel to, and may be in face-to-face contact with, the back panel 714. Additionally, the top panel 810 is substantially parallel to, and may be in face-to-face contact with, the top lip 722 of the back panel 714.

In the example embodiment, the front panel 808 includes an aperture 812. The aperture 812 is oriented such that the wiring 720 (shown in FIG. 8) connects the reel mechanism within the respective reel slot 308 (shown in FIGS. 4 and 6) through the back aperture 718 of the back panel 714 and the aperture 812 of the front panel 808. The aperture 812 may vary in size and/or shape. For example, in some embodiments, the aperture 812 of the front panel 808 may be smaller than the respective back aperture 718 of the back panel 714, such that the height and/or width of the aperture 812 may be less than the respective height and/or width of the respective back aperture 718. The aperture 812 and/or the back aperture 718 may be sized to receive an electrical connection to connect one or more of the mounted reels within the respective reel slot 308 to the EGM, allowing the EGM to send electronic signals to the one or more of the mounted reels to control the display.

Figure 9:
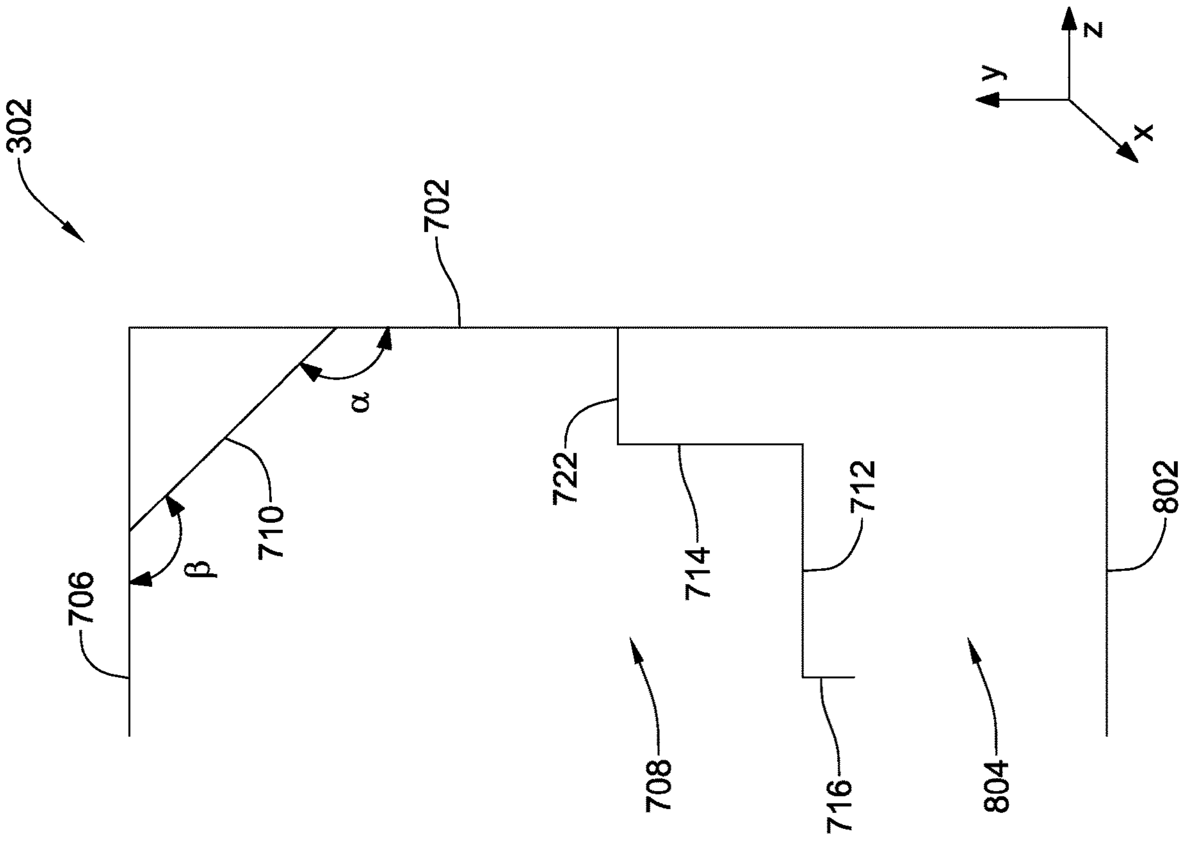
FIG. 9 is a schematic illustration of the example reel mount assembly shown in FIG. 7.

FIG. 9 is a schematic illustration of a side view of the reel mount assembly 302 within the cabinet 304. The cavity 708 may be defined by the back wall 702, the top wall 706, and the bottom panel 712. Additionally, the second cavity 804 may be defined by the back wall 702, the bottom panel 712, and the bottom wall 802.

Figure 10:
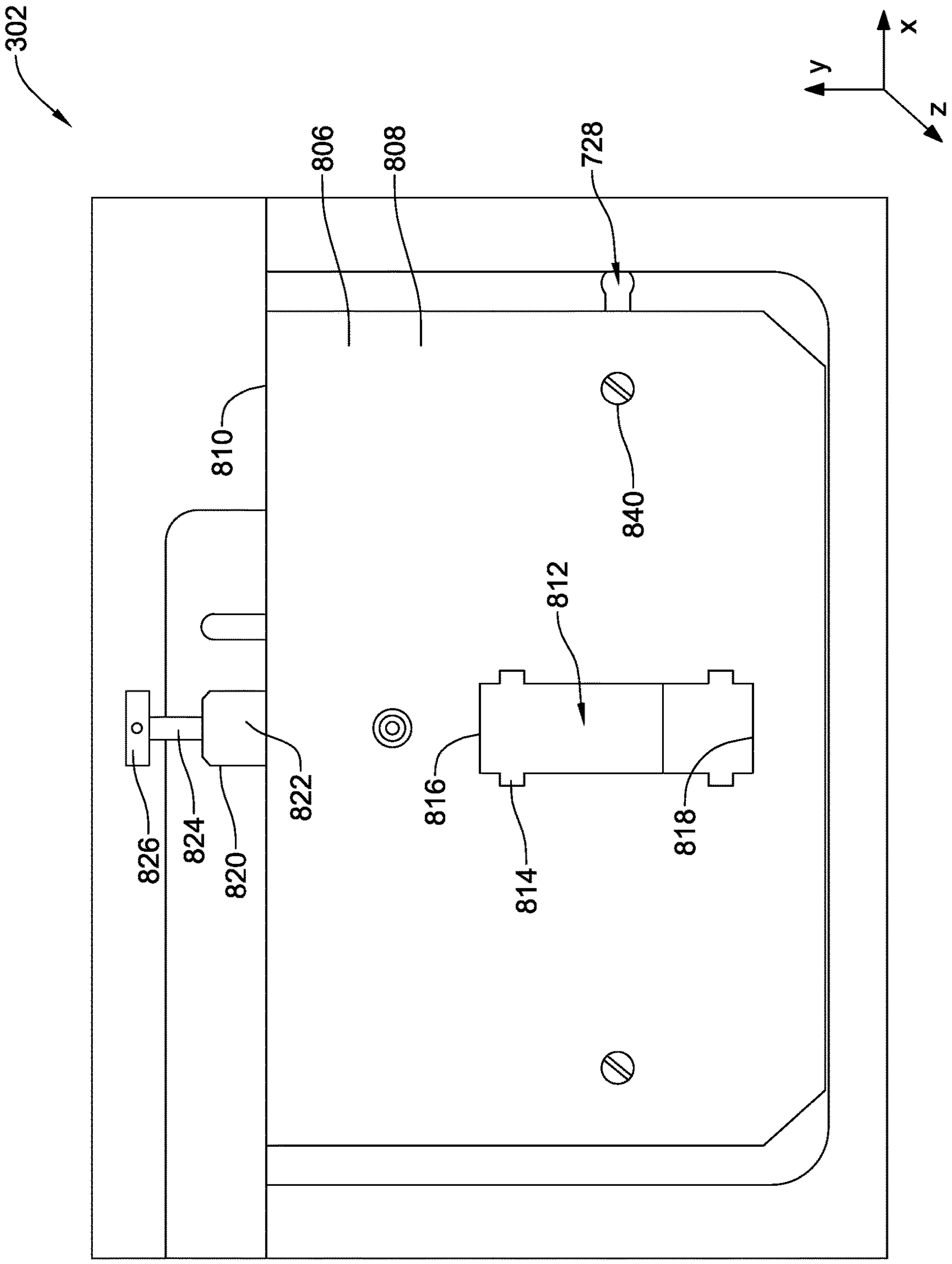
FIG. 10 is a front perspective view of an example reel mounting location on the example reel mount assembly shown in FIG. 8.

FIG. 10 is a front view of the panel 806 of the reel mount assembly 302, including the front panel 808 and the top panel 810. The aperture 812 of the front panel 808 may vary in size and shape. For example, in some embodiments, the aperture 812 may have a substantially rectangular shape, with a length dimension along the y-direction that is greater than a width dimension along the x-direction. The aperture 812 may include one or more protrusions or notches 814 proximate a top end 816 and/or a bottom end 818 of the aperture 812. As shown in FIG. 9, the aperture 812 may include one or more of the protrusions 814 proximate the top end 816 of the aperture 812 and extending opposite each other in the x-direction. Additionally, as shown in FIG. 9, the aperture 812 may include one or more of the protrusions 814 proximate the bottom end 818 of the aperture 812 and extending opposite each other in the x-direction. In some embodiments, the size and/or shape of the aperture 812 may be based on the size and/or shape of the wiring 720 (shown in FIG. 8).

Figure 11:
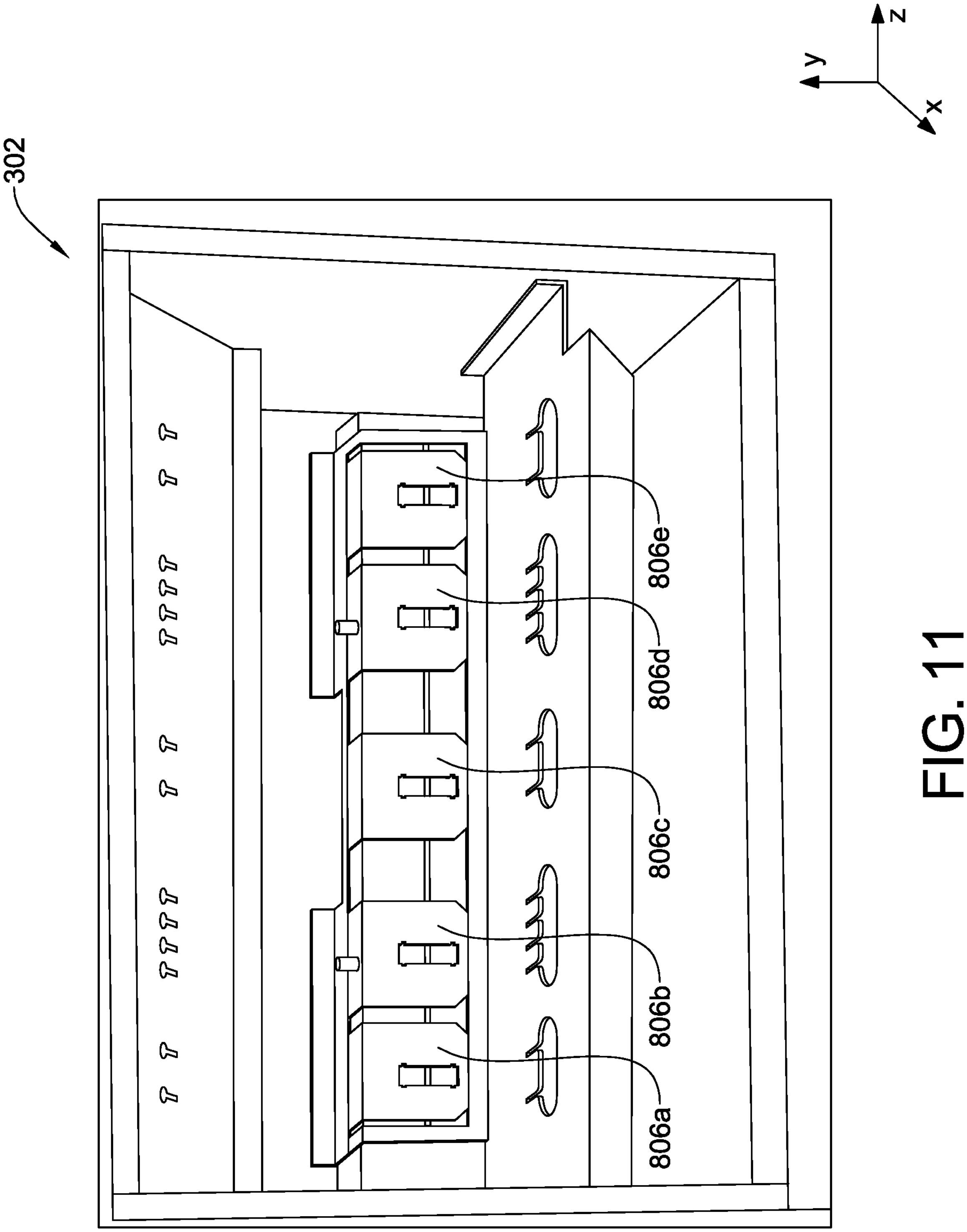
FIG. 11 is another front view of the example reel mount assembly shown in FIG. 8.
Figure 12:
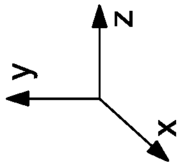
FIG. 12 is a further front view of the example reel mount assembly shown in FIG. 8.
Figure 12:
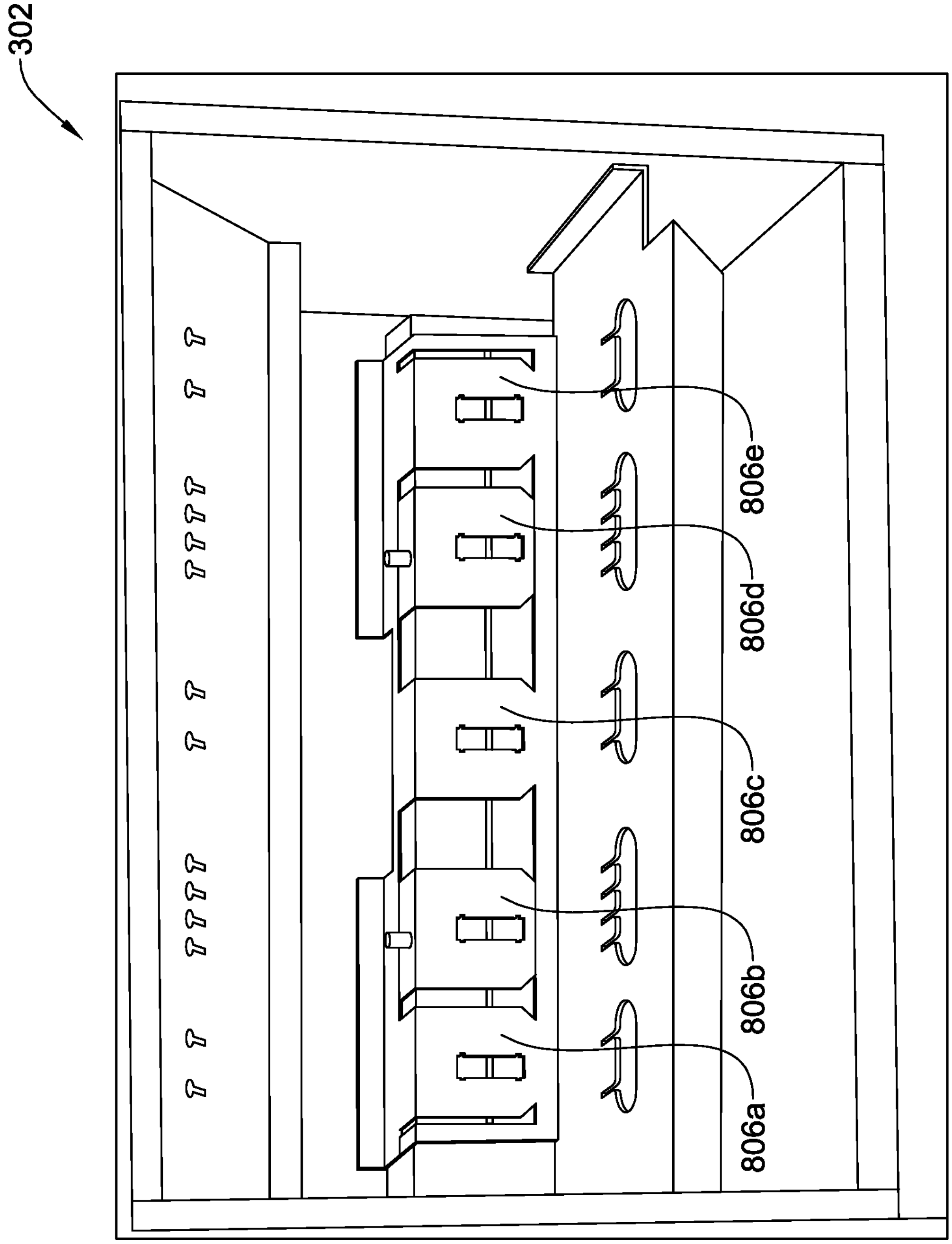

In the example embodiment, one or more of the plurality of panels 806 is configured for horizontal movement in the x-direction to facilitate supporting multiple reel configurations. As shown in FIGS. 11 and 12, the plurality of panels 806 may include a first panel 806*a*, a second panel 806*b*, a third panel 806*c*, a fourth panel 806*d*, and/or a fifth panel 806*c*. In the example embodiment, the second and fourth panels 806*b*, 806*d* are formed as separate panels. In some embodiments, the first, third, and fifth panels 806*a*, 806*c*, 806*e* may be formed as separate panels (shown in FIG. 11). In other embodiments, the first, third, and fifth panels 806*a*, 806*c*, 806*e* may be formed as a combined panel that includes each of the first, third, and fifth panels 806*a*, 806*c*, 806*e* (shown in FIG. 12).

As shown in FIGS. 11 and 12, the second and fourth panels 806*b*, 806*d* may be configured to move horizontally in the x-direction to facilitate supporting multiple reel configurations. For example, as shown in FIG. 3, the horizontal movement of the second and fourth panels 806*b*, 806*d* may facilitate supporting the first reel configuration, including five of the reel slots 308. Additionally, for example, as shown in FIG. 5, the horizontal movement of the second and fourth panels 806*b*, 806*d* may facilitate supporting the second reel configuration, including three of the reel slots 308.

In the example embodiment, each of the panels 806 configured to move horizontally includes a locking mechanism 820 that facilitates positioning the panel 806 to facilitate supporting multiple reel configurations. The locking mechanism 820 includes a shaft 822 and a pin 824, with the shaft 822 being coupled to the top panel 810 and oriented to receive the pin 824 in a vertical direction along the y-plane (e.g., with a length dimension of the pin 824 being along the y-plane). As shown in FIG. 10, the pin 824 may include a pin head 826 at a top 828 of the pin 824.

FIG. 11 is a front view of the reel mount assembly 302 within the cabinet 304. As shown in FIG. 11, each of the plurality of panels 806 (e.g., the first panel 806*a*, the second panel 806*b*, the third panel 806*c*, the fourth panel 806*d*, and the fifth panel 806*e*) may be formed as separate panels.

FIG. 12 is a front view of the reel mount assembly 302 within the cabinet 304. As shown in FIG. 12, the second and fourth panels 806*b*, 806*d* may be formed as separate panels and the first, third, and fifth panels 806*a*, 806*c*, 806*e* may be formed as a combined panel.

Figure 13B:
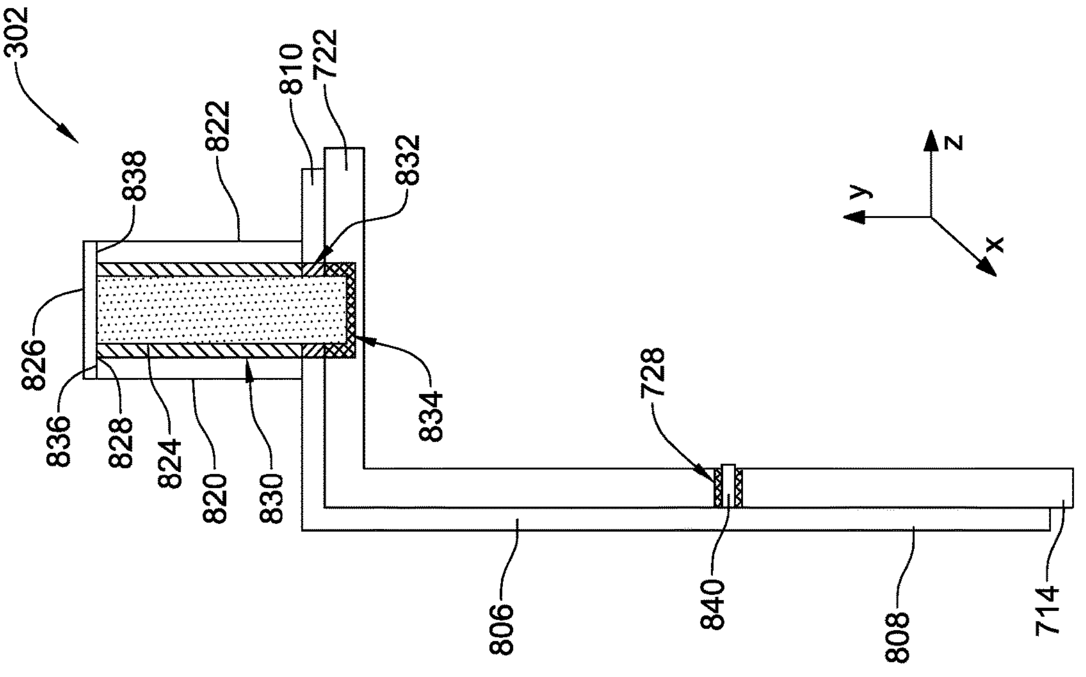
FIGS. 13A-13B are schematic illustrations of an example reel mounting location on the example reel mount assembly shown in FIG. 8.
Figure 13A:
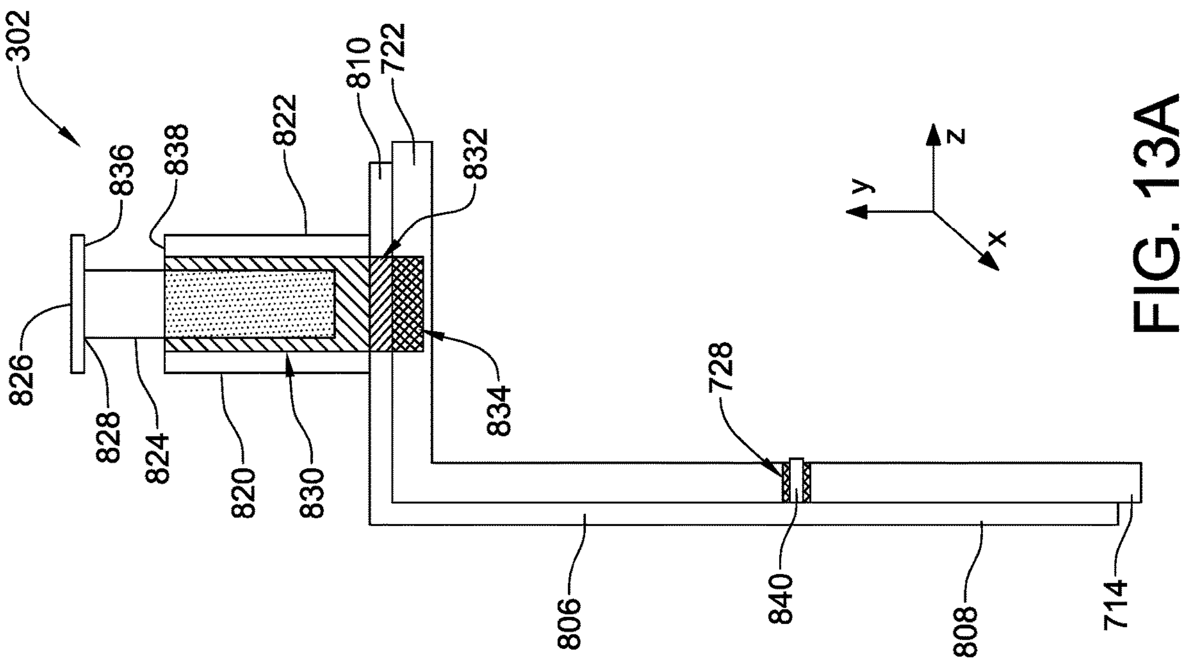

FIGS. 13A-13B are schematic illustrations of a side view of the locking mechanism 820 of one or more of the plurality of panels 806 of the reel mount assembly 302, such as the one or more of the plurality of panels 806 that are configured to move horizontally along the x-plane. In the example embodiment, the locking mechanism 820 is configurable to support a first pin configuration (shown in FIG. 13A), with the pin 824 in a raised position, and a second pin configuration (shown in FIG. 13B), with the pin 824 in a lowered position.

In the example embodiment, the shaft 822 includes a shaft aperture 830 into which the pin 824 is lowered for the second pin configuration (shown in FIG. 13B). The top panel 810 may include a first aperture 832 directly below the shaft aperture 830, such that the shaft aperture 830 and the first aperture 832 may be described as forming a "continuous" aperture into which the pin 824 is lowered for the second pin configuration (shown in FIG. 13B). Additionally, the top lip 722 of the back panel 714 may include a second aperture 834 directly below the first aperture 832, such that the shaft aperture 830, the first aperture 832, and the second aperture 834 may be described as forming a "continuous" aperture into which the pin 824 is lowered for the second pin configuration (shown in FIG. 13B). In some embodiments, the first aperture 832 and/or the second aperture 834 may be the same size and/or shape as the shaft aperture 830. In other embodiments, the first aperture 832 and/or the second aperture 834 be of a different size and/or shape than the shaft aperture 830.

As shown in FIG. 13A, the first pin configuration includes the pin 824 in a raised position such that there is no contact between a bottom surface 836 of the pin head 826 and an upper surface 838 of the shaft 822. The first pin configuration may include a portion of the pin 824 being within the shaft aperture 830 and a portion of the pin 824 being exterior to the shaft aperture 830. Thus, in the first pin configuration, the pin 824 may not inhibit the horizontal movement of the panel 806 in the x-direction, as no portion of the pin is within either the first aperture 832 of the top panel 810 or the second aperture 834 of the top lip 722 of the back panel 714.

As shown in FIG. 13B, the second pin configuration includes the pin 824 in a lowered position such that the bottom surface 836 of the pin head 826 is in face-to-face contact with an upper surface 838 of the shaft 822. The second pin configuration may include a portion of the pin 824 being within the shaft aperture 830, the first aperture 832 of the top panel 810, and/or the second aperture 834 of the top lip 722 of the back panel 714, with no portion of the pin 824 being exterior to the shaft aperture 830. Thus, in the second pin configuration, pin 824 may inhibit the horizontal movement of the panel 806 in the x-direction, due to the portion of the pin 824 within the first aperture 832 of the top panel 810 and/or the second aperture 834 of the top lip 722 of the back panel 714.

In the example embodiment, the positioning of the one or more panels 806 that are movable along the back panel 714 facilitates supporting the first reel configuration, including five of the reel slots 308, and/or the second reel configuration, including three of the reel slots 308. For example, the one or more panels 806 that are movable may include a fastening pin 840 coupled to the front panel 808, with the fastening pin 840 oriented towards the back panel 714 to be received by one of the plurality of channels 728. As shown in FIG. 10, the one or more panels 806 may include two of the fastening pins 840 oriented to move horizontally within the respective channel 728 as the panels 806 are moved horizontally along the x-plane.

In the example embodiment, the locking mechanism 820 facilitates reconfiguring the reel mount assembly 302 between the first reel configuration, including five of the reel slots 308, and the second reel configuration, including three of the reel slots 308. Specifically, the pin 824 of the locking mechanism 820 is raised and/or lowered within the shaft 822 to facilitate moving one or more of the panels 806 to space the apertures 812 of the plurality of panels 806 as needed to accommodate a set number of reel slots 308. For example, to accommodate three of the reel slots 308, the second and fourth panels 806*b*, 806*d* may be moved towards the respective side wall 704 of the cabinet to increase the space between the apertures 812 of the second, third, and fourth panels 806*b*, 806*c*, 806*d*, such that three of the second reel mechanism 318 (e.g., a decreased number of a broader reel mechanism) may be supported. Additionally, for example, to accommodate five of the reel slots 308, the second and fourth panels 806*b*, 806*d* may be moved away from the respective side wall 704 of the cabinet to decrease the space between the apertures 812 of the second, third, and fourth panels 806*b*, 806*c*, 806*d*, such that five of the first reel mechanism 316 (e.g., an increased number of a narrower reel mechanism) may be supported.

One or more of the reel slots 308 may be configured to engage with one or more of the slots 744 (shown in FIG. 8) and/or with one or more of the slits 736 of the respective bottom aperture 734 (shown in FIG. 8). For example, for the reel mount assembly 302 to accommodate three of the reel slots 308, the reel slots 308 may engage with a first set of slots 744 and/or a first set of slits 736 that align with the increased spacing between the second, third, and fourth panels 806*b*, 806*c*, 806*d*. Additionally, for example, for the reel mount assembly 302 to accommodate five of the reel slots 308, the reel slots 308 may engage with a second set of slots 744 and/or a second set of slits 736 that align with the decreased spacing between the second, third, and fourth panels 806*b*, 806*c*, 806*d*.

Figure 14:
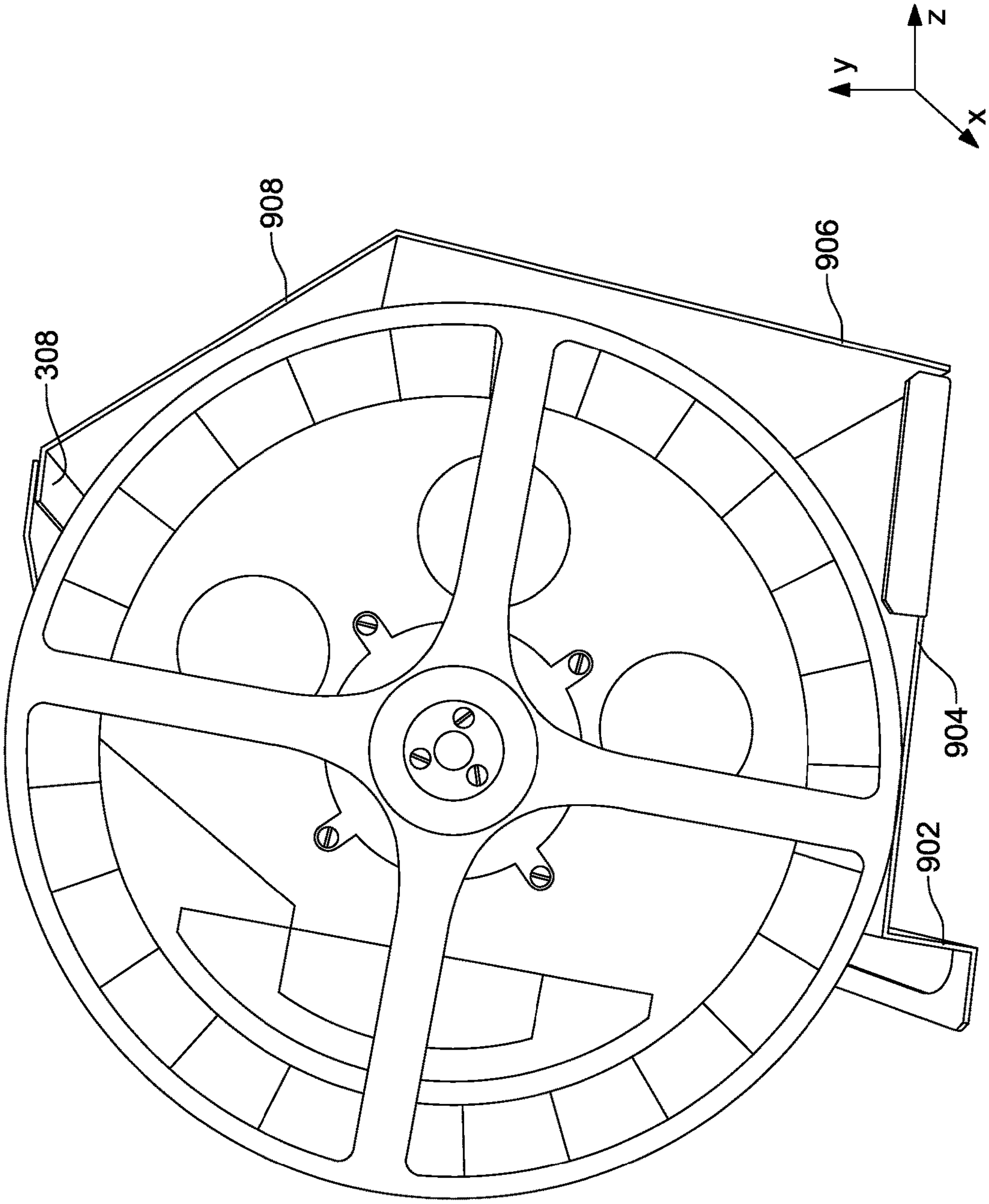
FIG. 14 is a side view of a reel mechanism for use with the example reel mount assembly of FIG. 8.

FIG. 14 is a side view of the reel slot 308 to be installed into the reel mount assembly 302. The reel slot 308 may include a plurality of surfaces that aligns with the various panels of the reel mount assembly 302 (shown in FIGS. 7 and 8). As shown in FIG. 14, the reel slot 308 may include a first surface 902, a second surface 904, a third surface 906, and/or a fourth surface 908. When installed in the reel mount assembly 302, the first surface 902 may align with the front lip 716 of the bottom panel 712, the second surface 904 may align with the bottom panel 712, the third surface 906 may align with the back panel 714, and/or the fourth surface 908 may align with the top panel 710. In some embodiments, the aligned surfaces and panels may be in face-to-face contact. In other embodiments, the aligned surfaces and panels may be in close proximity.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
- an electronic gaming machine (EGM) including a cabinet; and
- a reel mount assembly for mounting a plurality of reels within the cabinet, wherein the reel mount assembly comprises:
  - a back panel comprising a plurality of apertures to receive an electrical connection between one of the plurality of reels and the EGM; and
  - at least one sliding panel comprising a locking mechanism, wherein the at least one sliding panel is (i) moveable in relation to the back panel when the locking mechanism is in an unlocked position and (ii) stationary in relation to the back panel when the locking mechanism is in a locked position, the sliding panel configured to be coupled to a reel of the plurality of reels,
- wherein the reel mount assembly is configurable between one or more reel mounting configurations based on a position of the at least one sliding panel, the one or more reel mounting configurations comprising at least a first number of reels of the plurality of reels and a second number of reels of the plurality of reels.

2. The electronic gaming system of claim 1, wherein the one or more reel mounting configurations comprises a first reel mounting configuration having five reels of the plurality of reels and a second reel mounting configuration having three reels of the plurality of reels.

3. The electronic gaming system of claim 2, wherein in the first reel mounting configuration, the at least one sliding panel is positioned for five reels of the plurality of reels to be mounted in a side-by-side configuration and connected to the EGM through each of the plurality of apertures.

4. The electronic gaming system of claim 2, wherein in the second reel mounting configuration, the at least one sliding panel is positioned for three reels of the plurality of reels to be mounted in a side-by-side configuration and connected to the EGM through one or more interior apertures of the plurality of apertures.

5. The electronic gaming system of claim 2, wherein a reel width of each of the plurality of reels in the second reel mounting configuration is greater than the reel width of each of the plurality of reels in the first reel mounting configuration.

6. The electronic gaming system of claim 1, wherein the cabinet defines an internal cavity within which the plurality of reels are mounted.

7. The electronic gaming system of claim 1, wherein the locking mechanism is changeable between a first locking configuration having a pin in a raised pin position and a second locking configuration having the pin in a lowered pin position.

8. The electronic gaming system of claim 7, wherein the at least one sliding panel is movable in relation to the back panel when the locking mechanism is in the first locking configuration with the pin in the raised pin position.

9. The electronic gaming system of claim 1, wherein the at least one sliding panel comprises a first sliding panel and a second sliding panel, wherein the first sliding panel comprises the locking mechanism, wherein the first sliding panel is moveable in relation to the back panel and configured to be coupled to a reel of the plurality of reels, and wherein the second sliding panel comprises a second locking mechanism, wherein the second sliding panel is moveable in relation to the back panel and configured to be coupled to a second reel of the plurality of reels.

10. The electronic gaming system of claim 9, wherein each of the first sliding panel and the second sliding panel are movable between a first position in a first reel mounting configuration and a second position in a second reel mounting configuration.

11. The electronic gaming system of claim 10, wherein the first and second sliding panels are closer together in the first position than in the second position.

12. The electronic gaming system of claim 10, wherein the back panel comprises at least one slot positioned proximate an inner edge of each of the first and second sliding panels through which the first and second sliding panels move between the first position and the second position.

13. A reel mount assembly for mounting a plurality of reels within an electronic gaming machine (EGM), the reel mount assembly comprising:
- a back panel comprising a plurality of apertures to receive an electrical connection between one of a plurality of reels and the EGM; and
- at least one sliding panel comprising a locking mechanism, wherein the at least one sliding panel is (i) moveable in relation to the back panel when the locking mechanism is in an unlocked position and (ii) stationary in relation to the back panel when the locking mechanism is in a locked position, the sliding panel configured to be coupled to a reel of the plurality of reels, wherein the reel mount assembly is configurable between one or more reel mounting configurations based on a position of the at least one sliding panel, the one or more reel mounting configurations comprising at least a first number of reels of the plurality of reels and a second number of reels of the plurality of reels.

14. The reel mount assembly of claim 13, wherein the one or more reel mounting configurations comprises a first reel mounting configuration having five reels of the plurality of reels and a second reel mounting configuration having three reels of the plurality of reels.

15. The reel mount assembly of claim 14, wherein in the first reel mounting configuration, the at least one sliding panel is positioned for five reels of the plurality of reels to be mounted in a side-by-side configuration and connected to the EGM through each of the plurality of apertures.

16. The reel mount assembly of claim 14, wherein in the second reel mounting configuration, the at least one sliding panel is positioned for three reels of the plurality of reels to be mounted in a side-by-side configuration and connected to the EGM through one or more interior apertures of the plurality of apertures.

17. The reel mount assembly of claim 14, wherein a reel width of each of the plurality of reels in the second reel mounting configuration is greater than the reel width of each of the plurality of reels in the first reel mounting configuration.

18. The reel mount assembly of claim 13, wherein the locking mechanism is changeable between a first locking configuration having a pin in a raised pin position and a second locking configuration having the pin in a lowered pin position.

19. The reel mount assembly of claim 18, wherein the at least one sliding panel is movable in relation to the back panel when the locking mechanism is in the first locking configuration with the pin in the raised pin position.

20. The reel mount assembly of claim 13, wherein the at least one sliding panel comprises a first sliding panel and a second sliding panel, wherein the first sliding panel comprises the locking mechanism, wherein the first sliding panel is moveable in relation to the back panel and configured to be coupled to a reel of the plurality of reels, and wherein the second sliding panel comprises a second locking mechanism, wherein the second sliding panel is moveable in relation to the back panel and configured to be coupled to a second reel of the plurality of reels, and each of the first sliding panel and the second sliding panel being movable between a first position in a first reel mounting configuration and a second position in a second reel mounting configuration.

* * * * *